United States Patent [19]
Umeno

[11] Patent Number: 5,392,131
[45] Date of Patent: Feb. 21, 1995

[54] FACSIMILE MACHINE HAVING FUNCTION OF RETRIEVING STORED DOMUMENTS WAITING FOR TRANSMISSION

[75] Inventor: Kiyonobu Umeno, Hachioji, Japan

[73] Assignee: Kabushiki Kaisha Toshiba, Kawasaki, Japan

[21] Appl. No.: 826,827

[22] Filed: Jan. 28, 1992

[30] Foreign Application Priority Data

Jan. 29, 1991 [JP] Japan .................................. 3-119534

[51] Int. Cl.⁶ .................................................. H04N 1/00
[52] U.S. Cl. ..................................... 358/403; 358/440; 358/400; 379/100
[58] Field of Search ............... 358/402, 403, 434, 438, 358/440, 400, 468; 379/100

[56] References Cited

U.S. PATENT DOCUMENTS

| | | | |
|---|---|---|---|
| 4,646,160 | 2/1987 | Iizuka et al. | 358/402 |
| 4,870,503 | 9/1989 | Miura | 358/434 |
| 5,084,770 | 1/1992 | Nakayama | 358/440 |
| 5,095,373 | 3/1992 | Hisano | 358/403 |

FOREIGN PATENT DOCUMENTS 59-109776 10/1984 Japan ..................................... 358/403

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

A facsimile machine which has, in addition to a so-called memory transmission function of once storing documents to be transmitted in a memory and when a specified time of each document comes or a predetermined time elapses, of reading out a corresponding document from the memory, a novel function of retrieving documents stored in the memory and waiting for their transmission through operator's operation of a retrieval key, of displaying the retrieved result on a suitable display, and of selectively designating one of the transmission wait documents thus retrieved and displayed through predetermined document selecting operation of the operator to immediately transmit the designated document preferentially over the other documents.

4 Claims, 6 Drawing Sheets

FACSIMILE MACHINE HAVING FUNCTION OF RETRIEVING STORED DOMUMENTS WAITING FOR TRANSMISSION

BACKGROUND OF THE INVENTION

1. Field of the Invention

The present invention relates to a facsimile machine which has a so-called memory transmission function of once storing a plurality of documents to be transmitted in a memory and when a specified time of each document comes or a predetermined time elapses, of reading out corresponding one of the documents from the memory for its transmission, and also which has, in particular, a novel function of retrieving data of the stored documents waiting for transmission.

2. Description of the Related Art

Conventionally, there has been proposed such a facsimile machine that can once store image data read out from an original document into a memory and thereafter when a call to a destination party of the document is originated and a communication line is connected with the destination party, can read out the stored image data from the memory and transmit it to the destination party. With the facsimile machine having such a memory transmission function, when a busy state or an error takes place in a specified-time transmission mode or in a document transmission mode, the facsimile machine can perform its redialing operation to again transmit the document once stored in the memory to the destination party after passage of a predetermined time. Further, in the above redialing or specified-time transmission mode, the facsimile machine can accept a plurality of documents to be transmitted in the memory and can perform the above redialing or specified-time transmission operation with respect to each of the documents.

Such a conventional facsimile machine as mentioned above, however, manages all the documents stored in the memory to be transmitted during the operation of the redialing or specified-time transmission or redialing mode. Thus, once the facsimile machine puts the documents to be transmitted under its managing operation, the operator of the facsimile machine cannot readily know whether or not desired one of the documents is now in its redialing mode and further he cannot instruct the facsimile machine to immediately transmit the redial wait document. For this reason, the conventional facsimile machine has been disadvantageous in that, once the documents to be transmitted are put under control of the facsimile machine, the operator cannot instruct the facsimile machine and thus cannot change the operation of the machine. Thus, when such a situation takes place that requires to immediately transmit the redial wait document for some reason, the conventional facsimile machine cannot cope with such a demand quickly, that is, is disadvantageously poor in its operating convenience.

SUMMARY OF THE INVENTION

In view of such circumstances, it is an object of the present invention to provide a facsimile machine which can easily retrieve documents waiting for their redialing operation or transmission at their specified times.

Another object of the present invention is to provide a facsimile machine which can immediately transmit any one of retrieved documents through operator's instruction.

In accordance with one aspect of the present invention, the above objects are attained by providing a facsimile machine which has a function of once storing documents to be transmitted in a memory means and when a specified time of each document comes or a predetermined time elapses, of reading out corresponding one of the documents from the memory means and transmitting the corresponding document, and which facsimile machine comprises input means through which an operator enters a retrieval designation command; retrieval means, when receiving the retrieval designation command from the input means, for retrieving document data of the transmission wait documents stored in the memory means; and display means for displaying thereon the document data retrieved by the retrieved means.

In accordance with another aspect of the present invention, there is provided a facsimile machine which further comprises, in addition to the above arrangement, designation means for designating any one of the document data displayed on the display means and transmission control means for immediately transmitting one of the documents stored in the memory means corresponding to the document data designated by the designation means.

With the facsimile machine having such an arrangement, since the data of the aforementioned redial wait document or transmission-time wait document can be displayed on the display means through operator's instruction, the operator can immediately judge the completion or non-completion of transmission of the documents already subjected to the memory transmission processing while looking at the display data on the display screen.

With the latter arrangement, further, when the operator instructs the facsimile machine to transmit any one of the displayed documents, the machine can immediately transmit the corresponding document to a party, whereby, even when such a situation takes place that requires to immediately transmit the document as an emergency case, the facsimile machine can quickly cope with it.

Anyway, the operating convenience of the facsimile machine can be remarkably enhanced and thus its flexibility can be expanded.

DESCRIPTION OF THE PREFERRED EMBODIMENTS

Figure 1:
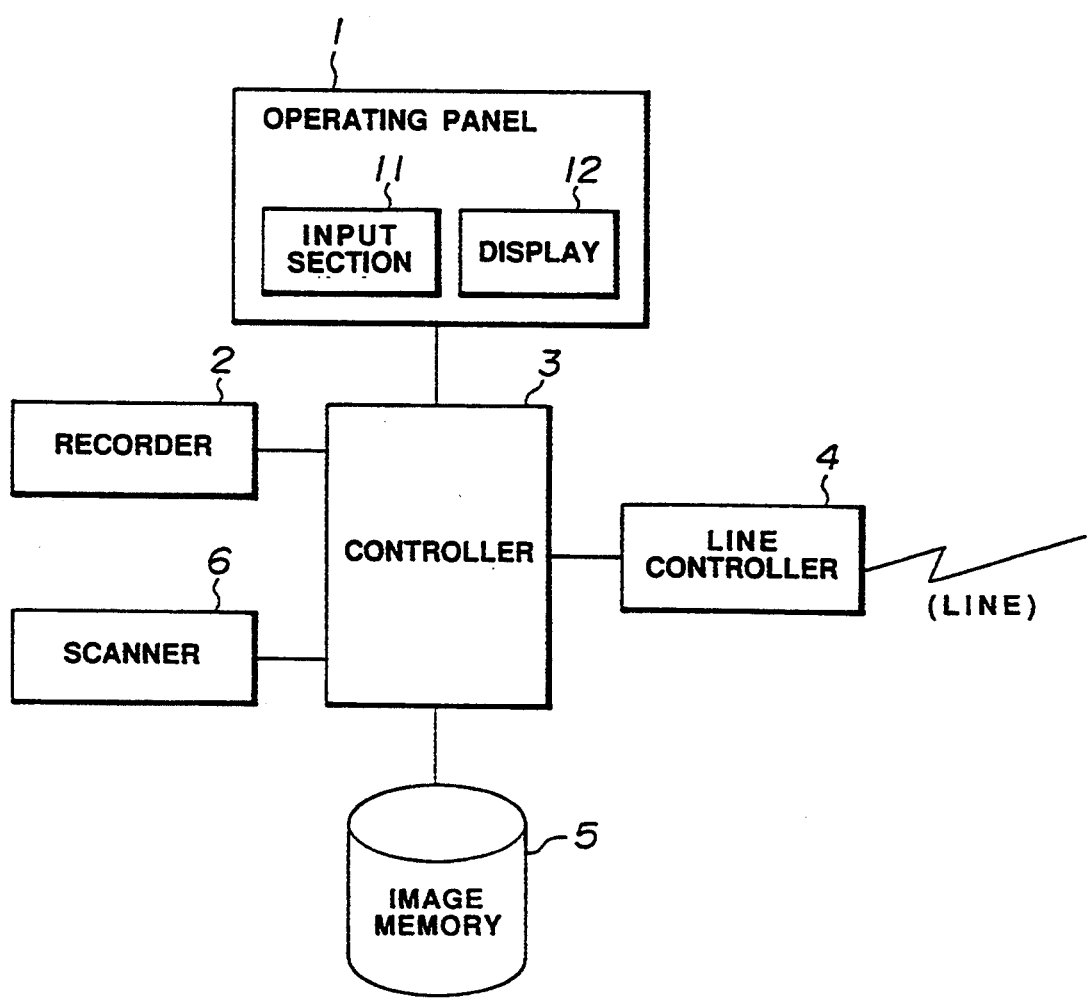
FIG. 1 is a block diagram of a facsimile machine having a function of retrieving registered documents to be transmitted in accordance with an embodiment of the present invention.

Referring to FIG. 1, there is shown a facsimile machine having a function of retrieving the data of a registered original document to be transmitted in accordance with an embodiment of the present invention.

More specifically, the facsimile machine of the present embodiment shown in FIG. 1 includes an operating panel 1 which has an input section 11 on which at least a keyboard is arranged for retrieval processing and priority transmission processing to be described later and also has a display 12 on which the data of an original document to be retrieved is displayed in the retrieval processing. An example of the operating panel 1 is illustrated in FIG. 2 for the reference.

Figure 2:
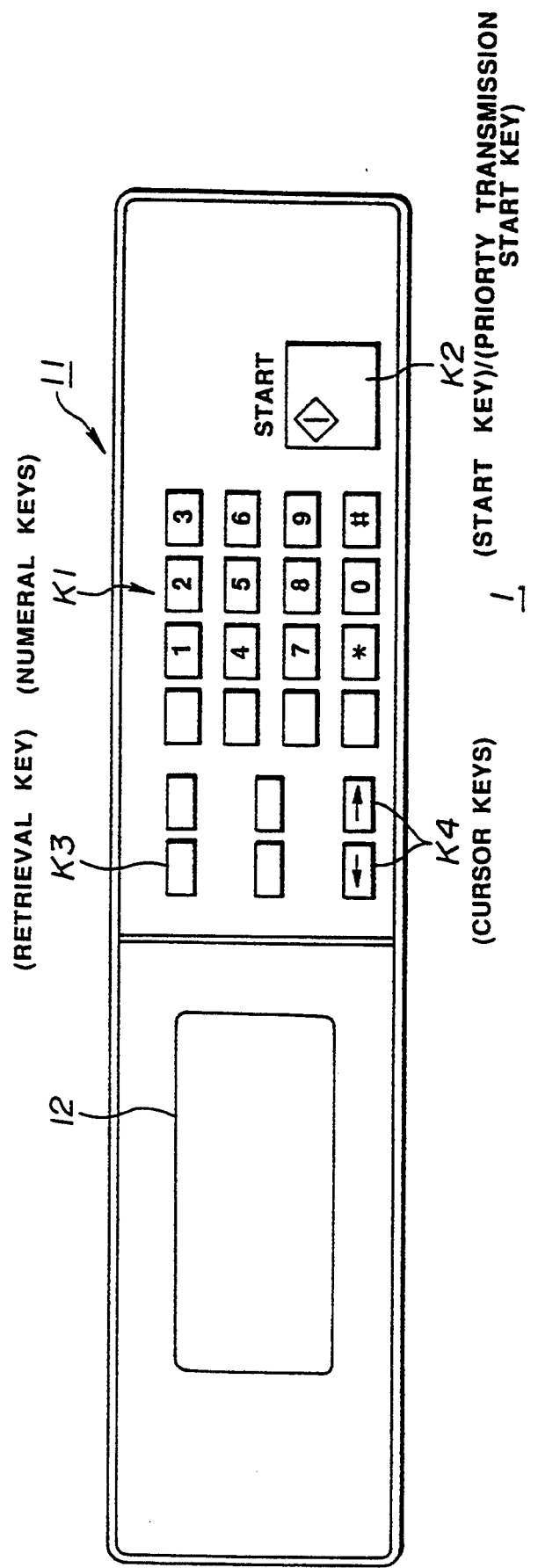
FIG. 2 is a plain view showing an example of an operating panel in FIG. 1.

In particular, in the input section 11 of the operating panel 1 of FIG. 2, reference symbol K1 generally denotes numeral keys for the input of dialing data, symbol K2 denotes a start key for designating the start of a transmission, K3 denotes a retrieval key for designating the start and end of a retrieval processing, and K4 denotes cursor keys for the switching (scrolling) of data displayed on the display 12. In the illustrated embodiment, in particular, when the retrieval key K3 is operated and its retrieval result is displayed on the display 12, the priority transmission function is active, in which state the start key K2 functions also as a priority transmission start key for a ready-for-transmission original document corresponding to the display data appearing on the display 12.

Returning again to FIG. 1, the embodiment of FIG. 1 further includes a recorder 2 for printing such image data as received image data on a recording paper to obtain its print-out, a controller 3 for performing control of transmission/reception of image data and general control over the entire machine, a line controller 4 for performing control of line seizure/release, data modulation/demodulation, etc., an image memory 5 for storing therein the image data of an original document or documents to be transmitted or the image data of a received document or documents, and a scanner 6 for reading out the contents of the original document to be transmitted to convert it into image data.

Figure 3:
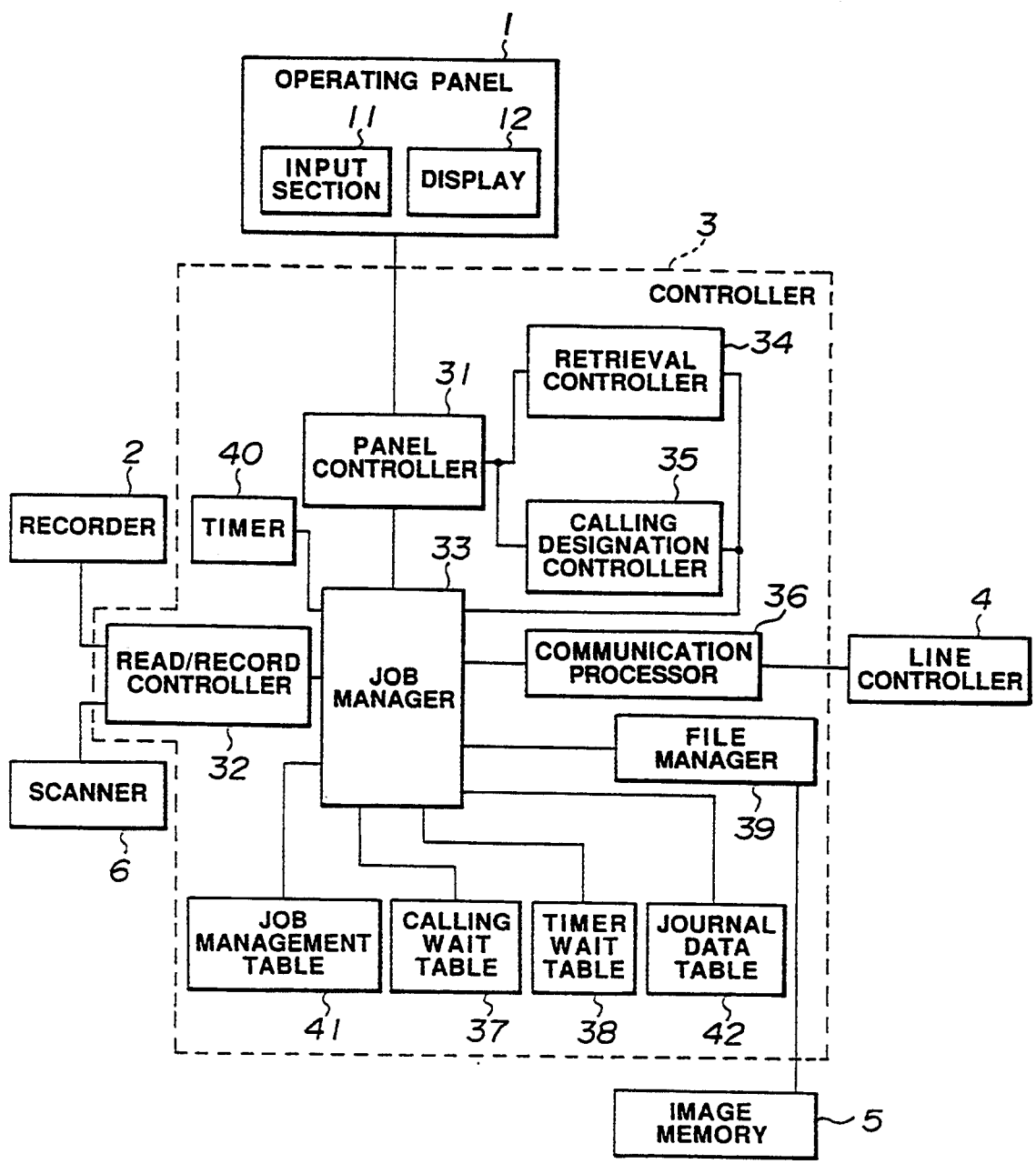
FIG. 3 is a block diagram of a specific structure of a controller in FIG. 1.

Shown in FIG. 3 is a specific arrangement of the aforementioned controller 3. More in detail, the controller 3 of FIG. 3 includes a panel controller 31 for controlling the input section 11 and display 12 provided on the operating panel 1 to fetch the contents each time input and designated by an operator and to control data display, a read/record controller 32 for controlling the recorder 2 and the scanner 6 to perform mainly input-/output control of image data, a job manager 33 for managing a job to be processed in the controller 3 or for distributing data to the respective functional blocks, a retrieval controller 34 for executing the retrieval processing of the original document stored in the image memory 5 based on the operation of the retrieval key K3 of the input section 11, a calling designation controller 35 for executing the priority transmission processing based on the operation of the start key K2 (in this case, priority transmission start key, especially) of the input section 11 when the document requiring emergency transmission is confirmed as a result of the retrieval processing, a communication processor 36 for performing communication processing of calling and signal reception and also for encoding the image data of the document to be transmitted into encoded image data according to a reception mode of a party or decoding encoded image data of a received document into predetermined decoded image data, a calling wait table 37 for holding therein the file number(s) of the document(s) to be transmitted, a timer wait table 38 for holding therein the file number of a document in its redial wait mode, and the file number of a document in its transmission-time wait mode, a file manager 39 for performing control of writing each document as a single file into the image memory 5 and also of reading it out from the image memory 5, a timer 40 for supplying time data to the job manager 33, a job management table 41 for holding therein such data as the transmission time data of a time-designated document and the file numbers of the documents stored in the image memory 5, and a journal data table 42 for registering and holding therein communication history (journal) data for the facsimile machine.

Further, the input section 11 forms input means, the panel controller 31 forms designating means, the retrieval controller 34 forms retrieval means, and the panel controller 31 and the display 12 form display means. In addition, the calling designation controller 35, the communication processor 36 and the file manager 39 form transmission control means.

The file manager 39 also has a function of encoding and decoding image data to be treated by its own, that is, functions, with respect to image data designated to be written from the job manager 33 to the image memory 5, to encode and write such image data in the image memory 5 while, with respect to image data designated to be read out from the image memory 5, conversely to decode and transfer such image data to the job manager 33.

Explanation will next be made as to the operation of the facsimile machine of the present embodiment. Assume now that an operator sets an original document to be transmitted on the document setting table (not shown) of the scanner 6 and enters a designation dial number through his operation of the numeral keys K1 of the input section 11 of the operating panel 1. Then the dial data is first received at the panel controller 31 and then sent through the job manager 33 to the communication processor 36. The communication processor 36, when receiving the dial data from the job manager 33, outputs the received dial data to the line controller 4 to call a destination party.

When, as a result of the calling operation, the line controller 4 seizes a line and the line controller 4 is connected to the destination party, the communication processor 36 further performs a predetermined known protocol communication with the facsimile machine of the party and issues an image-data input command via the job manager 33 to the read/record controller 32.

The read/record controller 32, when receiving the image-data input command in this way, activates the scanner 6 to read out the data of the original document placed on the document setting table and sends the read image data to the communication processor 36 through the job manager 33. This causes the communication processor 36 to transmit the received image data to the destination party through the line controller 4.

Explanation will then be made as to the operation of the facsimile machine of the present embodiment utilizing a so-called memory transmission function.

When it is desired to transmit a document in the memory transmission mode at a specified time, the operator enters, in addition to the above dial data, a command indicative of the designation of the memory transmission mode and the transmission time through the predetermined keys of the input section 11 in the operating panel 1. This causes the panel controller 31 to provide to the job manager 33 the memory transmission designating command and the transmission time entered from the input section 11.

The job manager 33, when receiving the dial number, transmission time and designation acceptance time data indicative of the acceptance of the memory transmission designation from the timer 40, stores these data in the job management table 41 and also issues an image-data input designation to the read/record controller 32. This results in that the read/record controller 32 activates the scanner 6 to read out the data of the original document and transfer the read image data through the job manager 33 to the file manager 39.

The file manager 39, when receiving the image data from the job manager 33 in this manner, stores in the image memory 5 the received image data together with the file number of the received image data issued at the job manager 33 during its transferring operation.

At the same time, the job manager 33 writes in the job management table 41 the above issued file number and data indicative of the number of read original document sheets in association with the above dial data, transmission time data and acceptance time data, while stored the file numbers and transmission times of documents not reaching their transmission times yet in the timer wait table 38 in the sequential order of their transmission times.

Thereafter, the job manager 33 monitors the transmission times of the documents stored in the timer wait table 38 based on the time data received from the timer 40. When finding a coincidence in the time data between the current time and one of the transmission time data stored in the timer wait table 38, the job manager 33 fetches out the coincidence document file number from the-table 38 and re-stores it in the calling wait table 37.

On the basis of the document file number stored in the calling wait table 37, on the other hand, the job manager 33 reads out the destination dial data of the associated document from the job management table 41 and sends it to the communication processor 36.

As in the above case, the communication processor 36, when receiving the dial data from the job manager 33, calls the corresponding destination party. When the line is connected to the party, the communication processor 36 informs the job manger 33 of a signal indicative of a successful line connection.

The job manager 33, when receiving the line connection signal-from the communication processor 36, applies the file number of the associated document to the file manager 39, reads out the corresponding document from the image memory 5, and applies the read document to the communication processor 36 to transmit the document to the destination party connected through the associated line via the communication processor 36.

In this way, the documents whose file numbers are stored in the calling wait table 37 are sequentially transmitted to the respective destination parties.

With respect to the document which transmission has been finished, the corresponding file number and associated data are deleted from the respective corresponding tables.

During the transmission of the document corresponding to the file number stored in the calling wait table 37 as mentioned above, however, if the busy state of the party or a communication error causes the present facsimile machine to be put in its redial wait mode, then the corresponding document file number stored in the calling wait table 37 is returned to the timer wait table 38 so that the document is put in its transmission wait mode until a redial time previously set in the present facsimile machine elapses. In this case, the job manager 33 monitors the redial time based on the time data received from the timer 40 and when recognizes the passage of the redial time, stores the document file number from the timer wait table 38 again into the calling wait table 37 to perform the same transmission processing as the above. However, since the file number of the document waiting for its transmission in such a redial wait mode is usually placed behind the last of the file numbers then stored in the timer wait table 38, when there are many such documents waiting for their transmission, its waiting time cannot be ignored.

To this end, the facsimile machine of the present embodiment is arranged so that, when it is desired to confirm whether or not the document subjected to the memory transmission processing is already transmitted, the operator can confirm it through the wait-document retrieving operation based on the operator's operation which follows. Further, when a document desired to be immediately transmitted is confirmed as a result of the retrieving operation, the facsimile machine can transmit the document in question preferentially over the other documents.

Figure 4:
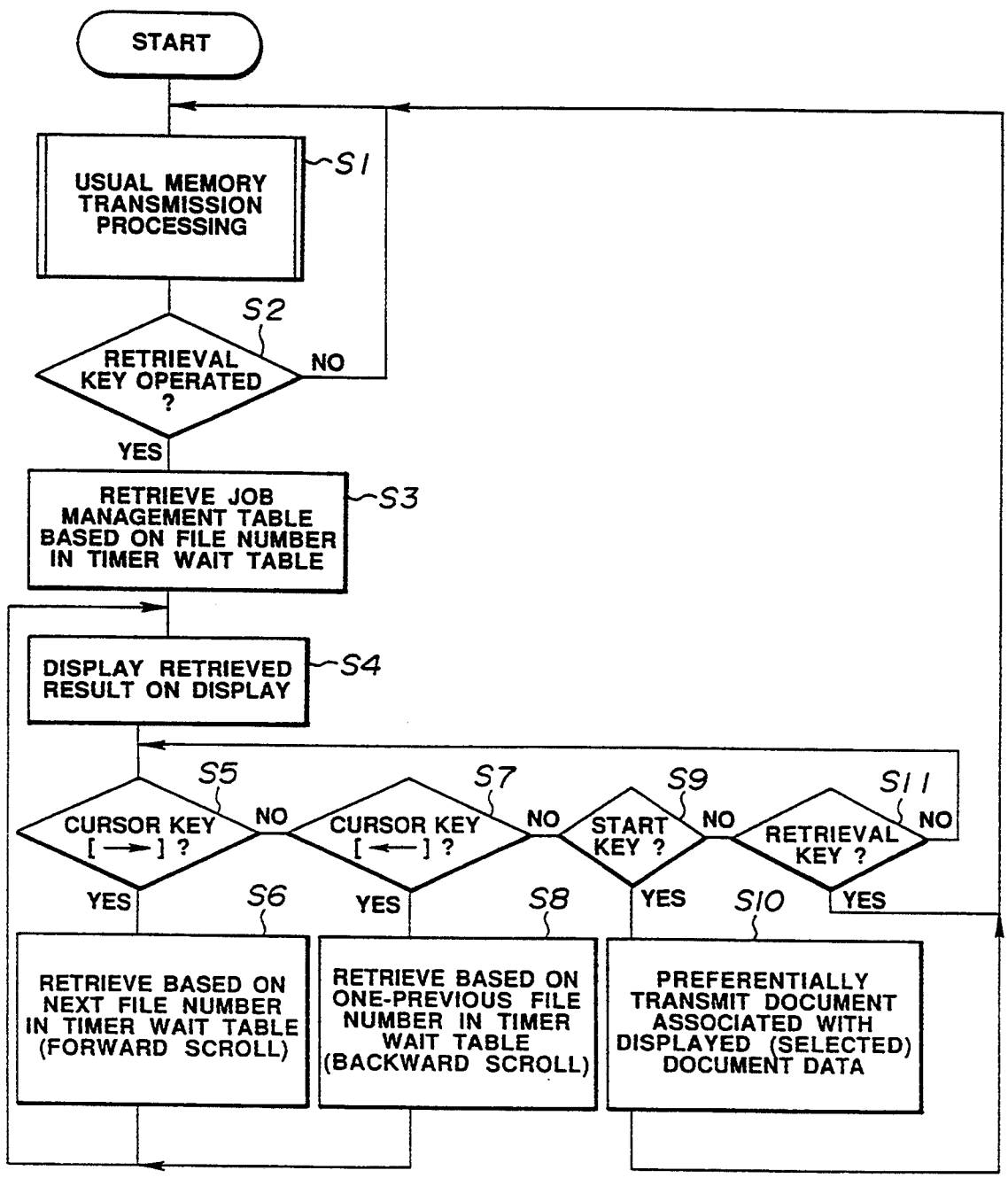
FIG. 4 is a flowchart showing a processing procedure of retrieving operation of a transmission wait document and priority transmission processing under the controller in FIG. 1.

FIG. 4 is a flowchart showing the procedure of retrieving and priority transmission operations of the facsimile machine (more precisely, controller 3) of the present embodiment for such documents waiting for their transmission. The retrieving and priority transmission operations of these transmission wait documents by the present facsimile machine will be detailed by referring also to FIG. 4 in the following.

Assume now that a plurality of documents to be transmitted are registered in the image memory 5 and the facsimile machine is executing the aforementioned memory transmission operation (refer to a step S1 in FIG. 4) as mentioned above. Then, when the operator operates the retrieval key K3 on the input section 11 of the operating panel 1 (refer to a step S2 in FIG. 4), this is recognized by the panel controller 31 and the panel controller 31 activates the retrieval controller 34.

The retrieval controller 34 thus activated references, e.g., the file number stored at the head of the document file numbers in the timer wait table 38 as a prescribed value, retrieves document data corresponding to the referenced file number from the job management table 41 (refer to a step S3 in FIG. 4), reads out as its retrieval result the associated document data, i.e., such data as the destination, acceptance time, document sheet number, etc. of the associated document from the job management table 41, and returns these data together with the corresponding file number to the panel controller 31 via the job manager 33.

Figure 5:
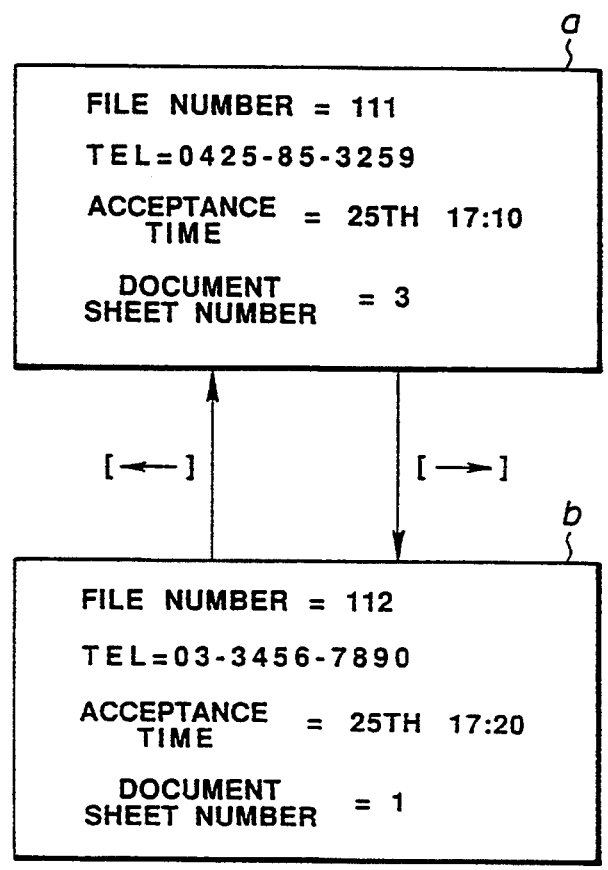
FIG. 5 schematically shows a display example of document data appearing on a display in FIG. 1.

This results in that the panel controller 31 displays on the display 12 the retrieved document data and the corresponding file number (refer to a step S4 in FIG. 4). An exemplary display of the document data appearing on the display 12 is shown in FIG. 5. In the example of FIG. 5, the document data to be retrieved at a time and displayed on the display 12 are assumed to be limited to the data associated with a single document.

When the operator operates one of the cursor keys K4 marked by [→] in order to forwardly scroll the display data as an example while looking at this display data (see a step S5 in FIG. 4), this is recognized by the panel controller 31 which in turn transmits the key operation data to the retrieval controller 34.

The retrieval controller 34, when receiving the operation data of the [→] key from the panel controller 31, newly references a file number next to the file number then referenced among the document file numbers stored in the timer wait table 38 and retrieves the corresponding document data from the job management table 41 on the basis of the newly referenced file number as in the above case (refer to a step S6 in FIG. 4). The thus retrieved document data is also read into the panel controller 31 together with the corresponding file number to be displayed on the display 12 (refer to the step S4 in FIG. 4). That is, through such a series of operations of the panel controller 31 and retrieval controller 34, a "forwardly scrolling" operation can be realized.

Conversely, when the operator operates the other of the cursor keys K4 marked by [←] (refer to a step S7 in FIG. 4), the retrieval controller 34 newly references a file number preceding the file number being then referenced by one and retrieves the document data corresponding to the newly referenced file number from the job management table 41 (refer to a step S8 in FIG. 4). And its retrieval result is also displayed on the display 12 under control of the panel controller 31 (see the step S4 of FIG. 4). As a result, a "backwardly scrolling" operation can be realized.

A transition of the displayed state caused by such scrolling operation is also illustrated in FIG. 5.

Through the scrolling operation of the document data based on the cursor keys K4, the operator can know all the transmission wait documents stored in the timer wait table 38 and the redial wait documents on the display 12.

And in accordance with the facsimile machine of the present embodiment, when the operator confirms one of these transmission time wait documents and redial wait documents to be immediately transmitted by means of the above observation of the display screen, he operates the start key K2 under such a condition that the data of the confirmed document appears on the display 12, that is, that the same document is selected, which results in that the aforementioned priority transmission processing of executing and transmitting the corresponding document is carried out preferentially over the other documents, as already explained in the foregoing.

More in detail, in this case, when the operator operates the start key K2 (refer to a step S9 in FIG. 4), this is recognized by the panel controller 31 which in turn activates the calling designation controller 35.

The calling designation controller 35 thus activated, when receiving the file number of the document being then selected (retrieved) from the panel controller 31, provides an instruction to the job manager 33 to move the received document file number from the timer wait table 38 to the calling wait table 37 and re-store it at the head of the table 37, and also provides to the communication processor 36 the destination data of the associated document registered in the job management table 41 to cause the communication processor 36 to call the destination party designated by the destination data (refer to a step S10 in FIG. 4). As a result, transmission of the associated document directed to the destination party is immediately carried out so long as this causes no trouble in the connection with the destination party. In this case, such usual memory transmission processing (see the step S1 in FIG. 4) as mentioned above is carried out until the operator again operates the retrieval key K3 later.

Further, even when operator again operates the retrieval key K3 while not operating the start key K2 during the above retrieving operation (refer to a step S11 in FIG. 4), the usual memory transmission processing (step S1 of FIG. 4) is similarly carried out until the operator operates the retrieval key K3 for the third time thereafter.

Even in this case, with respect to the document which transmission has already been finished, the job manager 33 deletes the file number and associated data of the associated document from the respective associated tables.

In this way, in accordance with the facsimile machine of the present embodiment, since the redial wait documents or the transmission time wait documents stored in the timer wait table 38 can be displayed on the display 12 through operator's designation, the operator can judge the completion or non-completion of transmission of the documents subjected to the memory transmission processing by looking at the data appearing on the display screen. In addition, when the operator designates the calling operation of an arbitrary one of the documents in the timer wait table 38, the designated document can be immediately transmitted. As a result, even when it is desired to immediately transmit a document as an emergency case, the present facsimile machine can quickly cope with it and therefore its operating convenience can be enhanced.

The document data to be retrieved at a time and displayed on the display 12 is limited to the data corresponding to a single document as exemplified in FIG. 5 in the foregoing embodiment. However, in the event where the display 12 comprises a display having a large display screen area, the invention may be arranged so that a plurality of document data are retrieved at a time and are displayed at a time on the display as exemplified in FIG. 6. Further, the invention may be arranged so that, as exemplified in FIG. 7, a part (e.g., data corresponding to one page of the document or data corresponding to a predetermined number of lines of the document) of the contents of a document to be retrieved by the retrieval controller 34, i.e., associated with the file number referenced at the time of its retrieving operation is read out from the image memory 5 and decoded into image data and the decoded image data is displayed on the display 12 in association with the data of the retrieved document under control of the job manager 33 and the file manager 39.

Figure 6:
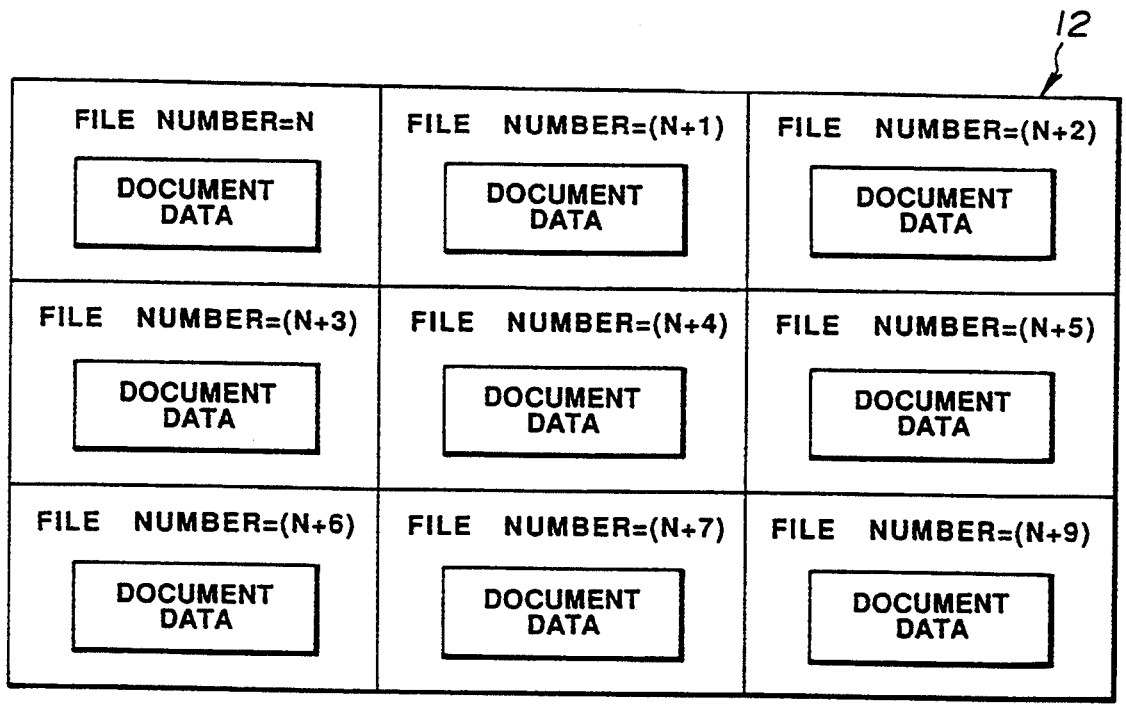
FIGS. 6 and 7 are schematic diagrams showing other display examples of the document data.
Figure 7:
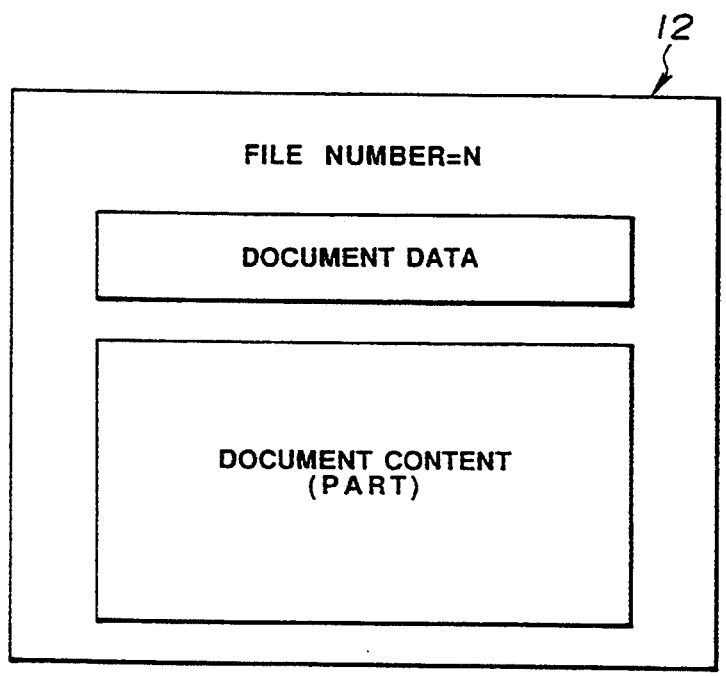

In the event where such a display structure as exemplified in FIG. 6 is employed, when such designating means as a known touchpanel is used, the document selecting operation in the aforementioned priority transmission processing can be made further simplified. In the event where such a display structure as exemplified in FIG. 7 is employed, identification between a plurality of transmission wait documents stored can be further simplified.

Although the retrieval key K3 has been commonly used as a key for designating the start of the retrieving operation and also as a key for designating the end of the retrieving operation in the foregoing embodiment, it goes without saying that the key for designating the end of the retrieving operation may be separately provided, for example, as a retrieval end key.

Further, the retrieval key K3 is not required to be provided always as an independent key. For example, this may be realized by selecting data indicative of designation of the retrieving operation from menu data (preferably, classified in the form of a hierarchical structure) displayed on the display 12 through operator's operation of menu keys such as cursor or numeral keys.

In the above embodiment, it is arranged to delete, with respect to the document which transmission has already been finished, the file number and associated data of the associated document from the respective associated tables through the job manager 33. However, it may be arranged not to delete but to keep the file number and the associated data in the associated tables so that, for example, the document which transmission has been finished can be re-transmitted to another destination.

What is claimed is:

1. A facsimile machine comprising:

an image memory for storing therein documents to be transmitted;

a management table for storing therein, in association with identification data of the documents stored in the image memory, transmission specified times and data on destination parties for transmission of the stored documents;

timer means for generating time data;

memory transmission means, when the time data generated by the timer means reaches a transmission specified time stored in the management table, for obtaining from the management table the document identification data and the destination party data, both associated with the reached transmission specified time, for reading out from the image memory the document associated with the document identification data obtained from the management table, for automatically transmitting the read out document to the destination party designated by the destination party data obtained from the management table, and, when the designated party does not respond to the automatic transmission, for periodically reading out from the image memory the document destined for the non-responding designated party, and for automatically retransmitting the read out document until the non-responding designated party responds;

retrieval means for retrieving from the management table identification data associated with non-transmitted documents; and priority transmission means for reading out from the image memory the non-transmitted documents associated with the identification data retrieved by the retrieval means and transmitting the read out documents in preference to the documents to be transmitted by the memory transmission means.

2. The facsimile machine as set forth in claim 1, wherein the management table comprises:

a job management table for storing therein, in association with the identification data of the documents to be transmitted, the transmission specified times and the data on the destination parties for transmission of the documents;

a timer wait table for storing therein the transmission specified times in association with the identification data of the documents to be transmitted and, when one of the destination parties does not respond to the automatic transmission by the memory transmission means, for updating one of the transmission specified times with a new transmission specified time which exceeds said one of the transmission specified times by a predetermined time interval; and a calling wait table, when the time data generated by the timer means reaches the transmission specified times stored in the timer wait table, for sequentially storing therein identification data of the documents associated with the transmission specified times, wherein the memory transmission means, on the basis of the identification data stored in the calling wait table, reads out from the image memory the documents associated with the identification data and automatically transmits the read out documents to the destination parties in accordance with the data on the destination parties, and wherein the retrieval means retrieves the identification data stored in the timer wait table.

3. The facsimile machine as set forth in claim 1, wherein the retrieval means comprises:

display means for displaying the identification data associated with non-transmitted documents stored in the management table; and selection means for selecting desired identification data from the identification data displayed on the display means.

4. The facsimile machine as set forth in claim 3, wherein the display means displays the identification data associated with one of the non-transmitted documents stored in the management table together with a part of one of the documents associated with said one of the identification data.

* * * * *